(12) United States Patent
Ostwald et al.

(10) Patent No.: US 6,868,049 B2
(45) Date of Patent: Mar. 15, 2005

(54) METHOD AND SYSTEM FOR ACCESSING MULTIPLE ROWS OF MEDIA OBJECTS IN AN AUTOMATED STORAGE LIBRARY USING A SINGLE TRACK ROBOTIC MECHANISM

(75) Inventors: Timothy C. Ostwald, Louisville, CO (US); Frank Smith, Nederland, CO (US); James M. Frary, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 728 days.

(21) Appl. No.: 09/728,960

(22) Filed: Dec. 4, 2000

(65) Prior Publication Data

US 2004/0202062 A1 Oct. 14, 2004

(51) Int. Cl.[7] .............................. G11B 17/22; G11B 5/16
(52) U.S. Cl. ................................ 369/36.01; 369/38.01; 360/99.02
(58) Field of Search ..................... 360/99.02; 369/36.01, 369/38.01, 30.3, 30.31, 30.32, 30.33, 30.34, 30.35, 30.36, 30.37, 30.38, 30.39, 30.4, 30.41, 30.42, 30.43, 30.44, 30.45, 30.46, 30.47, 30.48, 30.49

(56) References Cited

U.S. PATENT DOCUMENTS

| | | | |
|---|---|---|---|
| 3,831,197 A | * 8/1974 | Beach et al. ................... 360/71 |
| 4,937,690 A | 6/1990 | Yamashita et al. | |
| 4,989,191 A | * 1/1991 | Kuo .......................... 369/30.76 |
| 5,043,962 A | * 8/1991 | Wanger et al. ............ 369/30.48 |
| 5,128,912 A | * 7/1992 | Hug et al. ................. 369/30.61 |
| 5,206,845 A | 4/1993 | Baxter et al. | |
| 5,303,214 A | 4/1994 | Kulakowski et al. | |
| 5,546,366 A | 8/1996 | Dang | |
| 5,818,723 A | * 10/1998 | Dimitri ..................... 369/30.34 |
| 5,970,030 A | 10/1999 | Dimitri et al. | |
| 6,262,863 B1 | * 7/2001 | Ostwald et al. .......... 369/30.45 |
| 6,639,879 B2 | * 10/2003 | Plutt et al. ................ 369/30.45 |

FOREIGN PATENT DOCUMENTS

| | | | | |
|---|---|---|---|---|
| EP | 0 289 986 | | 11/1988 | |
| EP | 0768657 A1 | * | 4/1997 | ........... G11B/15/68 |
| WO | WO 02/47076 A2 | * | 6/2002 | |

OTHER PUBLICATIONS

"Moving Rack Automated Library for Removable Data Storage Media", IBM Technical Disclosure Bulletin, IBM Corp., New York, US, vol. 36, No. 9A, Sep. 1, 1993, pp. 119–120.

* cited by examiner

Primary Examiner—A. J. Heinz
Assistant Examiner—Christopher R. Magee
(74) Attorney, Agent, or Firm—Brooks Kushman P.C.

(57) ABSTRACT

A method and system for accessing media objects in an automated storage library using a robotic mechanism included mounting the robotic mechanism to a horizontally arranged track arranged in the same plane as first and second horizontal rows of media object storage cells. Each of the media object storage cells houses a media object. The horizontally arranged track is disposed adjacent to the first row of media object storage cells. The robotic mechanism is mounted to the track for moving horizontally along the track. A media object manipulation mechanism such as a gripper mechanism is coupled to the robotic mechanism. The media object manipulation mechanism is vertically movable for moving between the first and second rows of media object storage cells when the robotic mechanism is coupled to the track to manipulate the media objects housed within the first and second rows of media object storage cells.

22 Claims, 4 Drawing Sheets

METHOD AND SYSTEM FOR ACCESSING MULTIPLE ROWS OF MEDIA OBJECTS IN AN AUTOMATED STORAGE LIBRARY USING A SINGLE TRACK ROBOTIC MECHANISM

TECHNICAL FIELD

The present invention relates generally to automated media storage libraries having robotic mechanisms that move about tracks for manipulating media objects stored along media object rows within the storage libraries and, more particularly, to a method and system for accessing multiple object rows in an automated storage library using a single robotic mechanism mounted to a track arranged in the same plane as the media object rows.

BACKGROUND ART

Existing automated media storage libraries are capable of storing and retrieving large quantities of information stored on media objects such as cartridges. This is accomplished by the use of a large number of cartridge storage cells, each of which houses a media cartridge, that are housed within an enclosure. Such storage libraries use a robotic mechanism (e.g., robot, picker, handbot, accessor, and the like) to quickly move the media cartridges between their media cartridge storage cells and media cartridge players. For example, to retrieve information that is stored on a selected media cartridge, a robotic mechanism moves to a location opposite the media cartridge storage cell housing the selected media cartridge. An end effector of the robotic mechanism then grasps the media cartridge and extracts it from the media cartridge storage cell to a media player where the end effector loads the media cartridge into the media player.

As automated storage libraries have become larger and more complex, their designs have evolved from a single robotic arm performing all media cartridge manipulations to multiple robotic mechanisms operating on several media cartridges and media players simultaneously. The ability to manipulate several media cartridges simultaneously has increased the throughput of the automated storage libraries. While one independent robotic mechanism is busy transferring one media cartridge from a media storage cell to a media player for mounting, a second independent robotic mechanism can be transferring another media cartridge to an access port, while a third robotic mechanism may be conducting an inventory of the storage library.

A typical automated storage library includes horizontally arranged support tracks laid throughout the storage library. The tracks are positioned along horizontally arranged rows of the storage library in the same plane of the rows. Each row includes multiple media cartridge storage cells. The media cartridge storage cells of the horizontally arranged rows form vertically arranged columns. The robotic mechanisms mount to the tracks to move horizontally along the rows throughout the storage library to access the media cartridges and the media players. The robotic mechanisms may include drive or propulsion means coupled to driving wheels for moving along the tracks. The robotic mechanisms may further include media object manipulation mechanisms such as media cartridge pickers or grippers, bar code reading devices, and other task oriented sub-modules for performing various tasks on media cartridges and media players.

It is generally desired that at least one robotic mechanism be mounted on a track associated with a media cartridge storage cell row of a storage library. For instance, if there are twelve media cartridge storage cell rows in the storage library then it is desired that there be twelve robotic mechanisms (one for each row or more for redundancy) in the storage library. Each robotic mechanism is a relatively expensive high performance device. Accordingly, a problem with having at least one robotic mechanism for each media cartridge storage cell row is the cost associated with such a relatively large number of robotic mechanisms.

SUMMARY OF THE INVENTION

Accordingly, it is an object of the present invention to provide a method and system for accessing multiple media object vertically arranged columns and horizontally arranged rows in an automated storage library using a single robotic mechanism mounted to a horizontally arranged track arranged in the same plane of the media object rows.

It is another object of the present invention to provide a method and system in which a plurality of robotic mechanisms mounted to horizontally arranged tracks arranged in the same plane as horizontally arranged media object rows in an automated storage library each have storage library media object column and row accessibility.

It is a further object of the present invention to provide a method and system in which a plurality of robotic mechanisms mounted to horizontally arranged tracks arranged in the same plane as horizontally arranged media object rows in an automated storage library each have horizontal and vertical movement capability to access media object columns and rows in the storage library.

It is still another object of the present invention to provide a method and system in which a plurality of robotic mechanisms mounted to horizontally arranged tracks arranged in the same plane as horizontally arranged media object rows in an automated storage library each have rotational movement capability to access media object columns and rows in the storage library.

In carrying out the above objects and other objects, the present invention provides a storage library for the storage and retrieval of media objects. The storage library includes first and second horizontally arranged rows of media object storage cells arranged in a common plane. Each of the media object storage cells is for housing a media object. A horizontally arranged track is arranged in the common plane and disposed adjacent to the first row of media object storage cells. A robotic mechanism is coupled to the track for moving horizontally along the track. A media object manipulation mechanism such as a gripper mechanism is coupled to the robotic mechanism. The gripper mechanism is vertically movable for moving between the first and second rows of media object storage cells when the robotic mechanism is coupled to the track to manipulate the media objects housed within the first and second rows of media object storage cells.

The gripper mechanism is vertically movable to move from the first row of media object storage cells to the second row of media object storage cells. The gripper mechanism is vertically movable to move from the second row of media object storage cells back to the first row of media object storage cells.

The storage library may include a third horizontally arranged row of media object storage cells arranged in the common plane. The gripper mechanism is vertically movable for moving between the first, second, and third rows of media object storage cells to manipulate the media objects housed within the first, second, and third rows of media object storage cells.

The track may be disposed between the first and second rows of media object storage cells. The second row may be below the first row with the track disposed above the first row. The media objects may include media cartridges and media players. The gripper mechanism may move vertically directly or rotationally between the first and second rows.

The storage library may include third and fourth horizontally arranged rows of media object storage cells arranged in the common plane and a second horizontally arranged track arranged in the common plane and disposed adjacent to the third row of media object storage cells. A second robotic mechanism is coupled to the second track for moving horizontally along the second track. A second gripper mechanism is coupled to the second robotic mechanism. The second gripper mechanism is vertically movable for moving between the third and fourth rows of media object storage cells when the second robotic mechanism is coupled to the second track to manipulate the media objects housed within the third and fourth rows of media object storage cells.

In carrying out the above objects and other objects, the present invention further provides a robotic mechanism for an automated storage library having first and second rows of media object storage cells arranged in a common plane. The robotic mechanism includes a media object manipulation mechanism and a carriage. The carriage couples to a track arranged in the common plane and disposed between the first and second rows of media object storage cells to move the media object manipulation mechanism along the track. The media object manipulation mechanism is vertically movable to manipulate media objects housed above and below the track in the first and second rows of media object storage cells of the automated storage library.

In carrying out the above objects and further objects, the present invention also provides a method of operating a storage library having first and second horizontally arranged rows of media object storage cells arranged in a common plane. Each of the media object storage cells is for housing a media object. A horizontally arranged track is arranged in the common plane and disposed adjacent to the first row of media object storage cells. The method includes coupling a robotic mechanism to the track for horizontal movement along the track. The method further includes vertically moving a media object manipulation mechanism coupled to the robotic mechanism between the first and second rows of media object storage cells when the robotic mechanism is coupled to the track for manipulating the media objects housed within the first and second rows of media object storage cells.

The advantages associated with the present invention are numerous. The present invention greatly reduces the cost associated with typical automated storage libraries having multiple robotic mechanisms while retaining access to all media objects contained in the storage library. The higher media object density allows the storage library to have more storage value per square foot. The present invention also creates a closer match between the host data needs (typical file size and time in drive numbers) and the performance of the storage library (mounts per unit time).

The above objects and other objects, features, and advantages of the present invention are readily apparent from the following detailed description of the best mode for carrying out the present invention when taken in connection with the accompanying drawings.

BEST MODE FOR CARRYING OUT THE INVENTION

In general, the present invention is a method and system for accessing multiple media object vertically arranged columns and horizontally arranged rows using a single robotic mechanism mounted to a horizontally arranged track arranged in the same plane as the media object rows in an automated storage library. The track mounted robotic mechanism is operable to move horizontally (X) across a row to access media objects in the row. The robotic mechanism includes a "Y" mechanism to vertically access media objects in other rows above and below the row in which the robotic mechanism moves across. Because the robotic mechanism has multiple row accessibility the cost of the storage library is reduced with respect to typical storage libraries. For example, in a storage library having twelve media object rows only four robotic mechanisms each having three row accessibility would be needed as opposed to twelve robotic mechanisms in typical storage libraries. The multiple row capability of each robotic mechanism reduces the need for the mechanical support and power rail system due to the reduced number of needed tracks. The new free space may be used for additional media object storage area thus increasing the storage density of the storage library.

Figure 1:
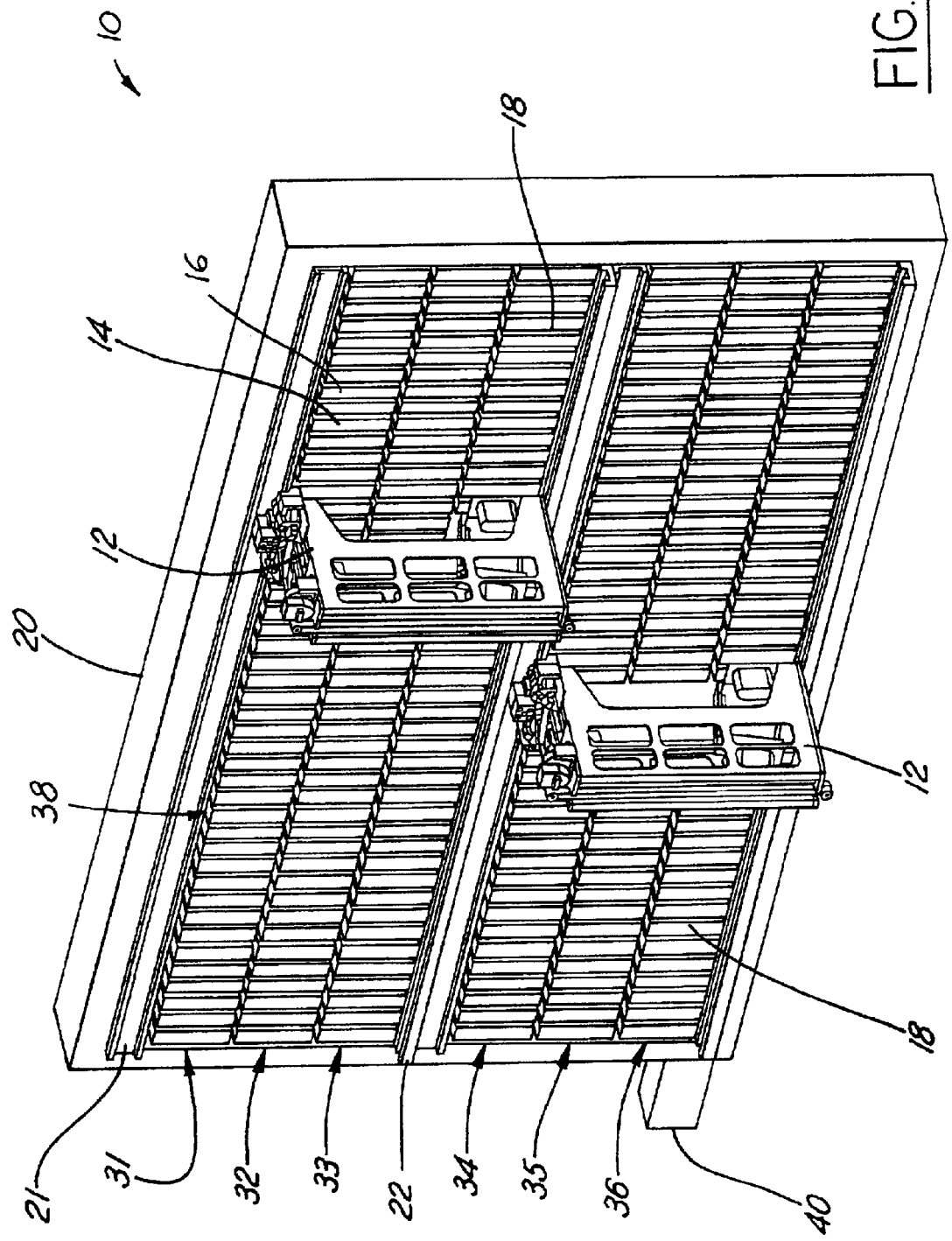
FIG. 1 illustrates a perspective view of an automated storage library for use with the method and system of the present invention.

Referring now to FIG. 1, an automated storage library 10 in accordance with the method and system of the present invention is shown. Storage library 10 includes multiple independent robotic mechanisms (robotic pods or accessors) 12 to enable the storage library to concurrently manipulate multiple media objects such as media cartridges 14. Storage library 10 includes a two-dimensional vertical standing array of media cartridge storage cells and media cartridge players 18 that are mounted in a frame 20. A system of horizontally arranged parallel tracks 21 and 22 guide robotic mechanisms 12 horizontally through all of the locations of the array. A system of powered rails are associated with tracks 21 and 22 for providing energy to robotic mechanisms 12 for the robotic mechanisms to use in carrying out various functions. Robotic mechanisms 12 contain a movable carriage that is capable of transporting robotic components, such as media cartridge pickers, bar code reading devices, and other task oriented sub-modules on tracks 21 and 22 of storage library 10.

Frame 20 is designed to receive a plurality of horizontal rows 31–36 of media cartridge storage cells 16 each of which is designed to house a single media cartridge 14. Rows 31–36 are arranged in a common plane and serve to frame media cartridge storage cells 16 and media cartridge players 18 on the top and bottom sides thereof. Subsets of media cartridge storage cells 16 in rows 31–36 form vertical columns. The vertical columns are generally designated as 38. For example, a media cartridge storage cell 16 in row 31 is directly above a media cartridge storage cell in row 32 and a media cartridge storage cell in row 33 is directly below the media cartridge storage cell in row 32, etc.

Media cartridge players 18 are shown in an arbitrary location in horizontally arranged rows 33 and 36 in frame 20. Storage library 10 can incorporate media cartridge players 18 at any location in frame 20 to optimize performance. Storage library 10 includes an array of media cartridge storage cells 16 fully populated with media cartridges 14 of any type.

Robotic mechanisms 12 are attached to frame 20 via horizontally arranged guide tracks 21 and 22. Tracks 21 and 22 are arranged in the common plane and disposed adjacent to at least one row of media cartridge storage cells 16. For example, track 21 is disposed adjacent to row 31 and track 22 is disposed adjacent to rows 33 and 34. Tracks 21 and 22 provide support of robotic mechanisms 12 in the vertical direction to oppose the force of gravity, and they also provide a meshing surface to impart traction in the horizontal direction for motive transport of the robotic mechanisms.

A storage library controller 40 provides commands to robotic mechanisms 12 to manipulate media cartridges 14. Controller 40 communicates with each robotic mechanism 12 individually by radio frequency communication links, infrared communication links, and other wireless communications links. Wired communications may also be used. Commands to robotic mechanisms 12 include movement along tracks 21 and 22, movement of media cartridges 14 into and out of the robotic mechanisms, reading bar codes on the media cartridges, and the like.

Controller 40 and robotic mechanisms 12 are operable with one another such that the controller knows the position of the robotic mechanisms within storage library 10 as they move about tracks 21 and 22. This is accomplished by mounting position sensors on robotic mechanisms 12 which provide information regarding the position of the robotic mechanisms to controller 40. This may also be accomplished by providing sensors on tracks 21 and 22 which are actuated to transmit a signal to controller 40 when a robotic mechanism 12 traverses a sensor on tracks 21 and 22. This may further be accomplished by having robotic mechanisms 12 provide information to controller 40 regarding the speed and direction of their travels through storage library 10.

Controller 40 may also be in communication with media cartridge players 18. Controller 40 may provide commands to mount and dismount media cartridges 14 into and out of media cartridge players 18. Controller 40 coordinates these commands with positioning commands to a robotic mechanism 12 that supplies or receives a media cartridge 14 to and from a media cartridge player 18.

Figure 2:
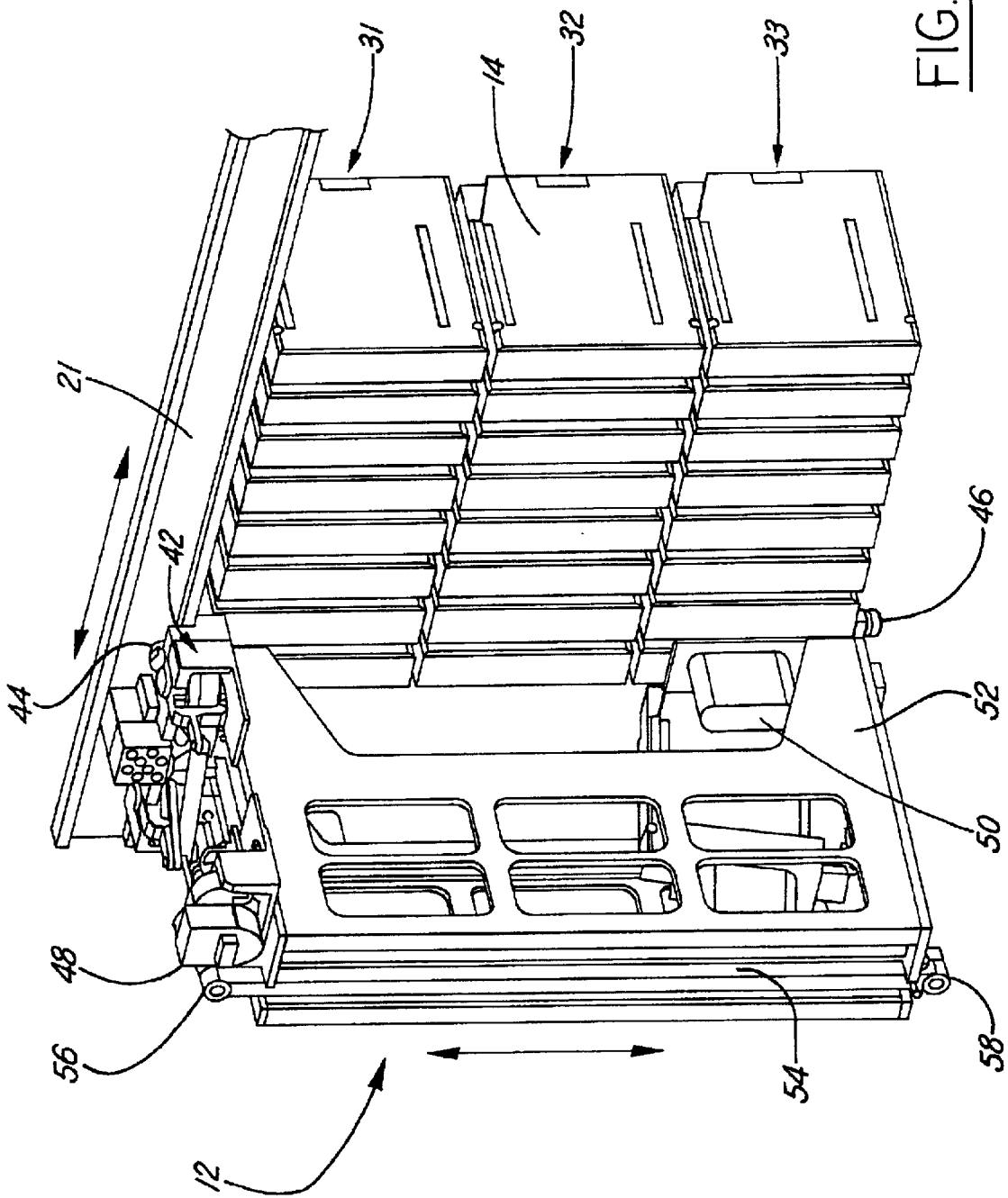
FIG. 2 illustrates a perspective view of a robotic mechanism in accordance with the method and system of the present invention.
Figure 3:
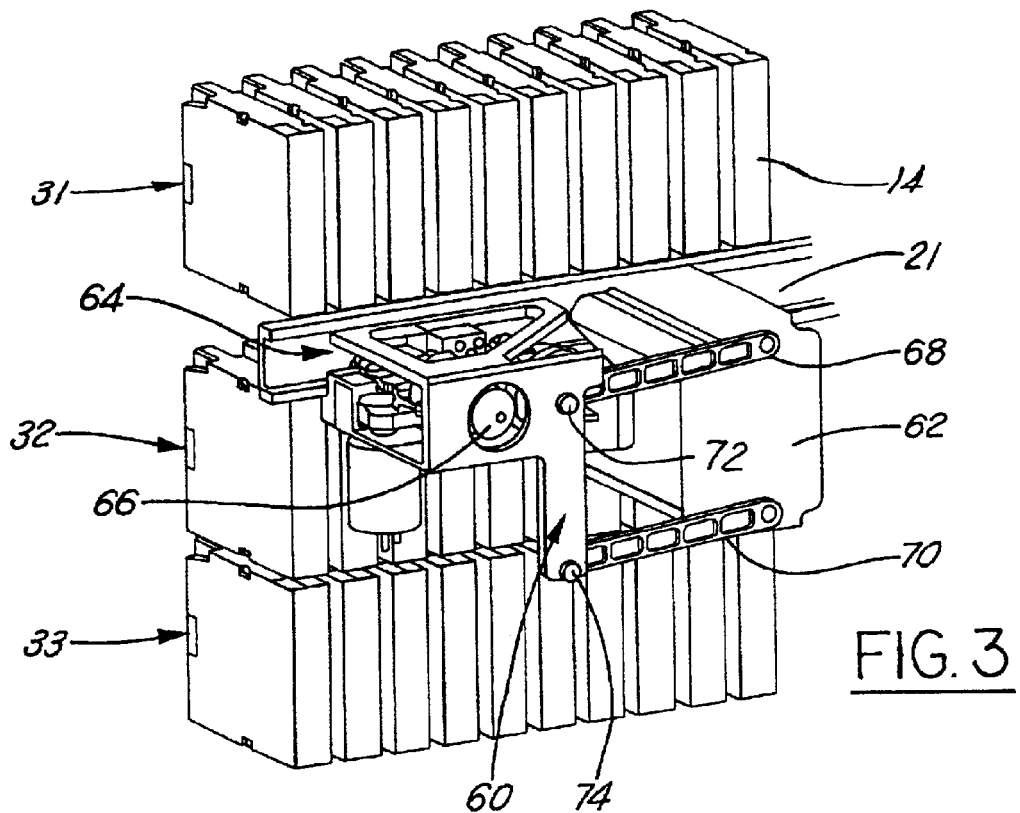
FIG. 3 illustrates a perspective view of an alternative embodiment of a robotic mechanism in accordance with the method and system of the present invention.

Referring now to FIG. 2, with continual reference to FIG. 1, a perspective view of a robotic mechanism 12 in accordance with the method and system of the present invention is shown. Robotic mechanism 12 includes a base assembly having a frame 42 for structural support. Frame 42 suspends in track 21 by drive wheels 44 that ride in a main groove provided in the track. Rotation of drive wheels 44 causes robotic mechanism 12 to move horizontally along track 21. Drive wheels 44 rotate clockwise and counterclockwise to allow robotic mechanism 12 to move in both directions along track 21. Idler wheels 46 are positioned at the bottom of robotic mechanism 12 for riding in additional grooves or tracks (not shown) of storage library 10. Idler wheels 46 help orient and guide robotic mechanism 12 with respect to media cartridge storage cells 16 and media cartridge players 18. Robotic mechanism 12 includes a drive motor 48 operable for driving drive wheels 44 to move the robotic mechanism along track 21.

Robotic mechanism 12 further includes a media object manipulation mechanism such as a gripper mechanism 50. Gripper mechanism 50 is operable to move to an extended position to grasp a media cartridge 14 from a media cartridge storage cell 16 or media cartridge player 18 and to move back to a retracted position to pull the media cartridge into robotic mechanism 12. Robotic mechanism 12 may then move horizontally along track 21 to transport the selected media cartridge 14 to a designated location such as a media cartridge player 18. Likewise, gripper mechanism 50 is operable to move from a retracted position to an extended position to place a media cartridge 14 into a media cartridge storage cell 16 or media cartridge player 18. Robotic mechanism 12 also includes a vertically extending housing 52. Housing 52 houses gripper mechanism 50 and extends vertically across three rows 31, 32, and 33 of media cartridges 14. It is to be appreciated that housing 52 may be appropriately sized to extend vertically across more than three rows for enabling gripper mechanism 50 to access more than three rows.

In accordance with the method and system of the present invention, gripper mechanism 50 is vertically movable to access media cartridges 14 along vertical columns in each of the three horizontal rows 31, 32, and 33. In order to vertically move, gripper mechanism 50 is attached by a drive belt 54 to motor 48. Drive belt 54 wraps around a pair of drive pulleys 56 and 58 mounted at each end of housing 52. Motor 48 is connected to drive pulley 56 for driving the drive pulley to vertically move gripper mechanism 50 via drive belt 54. As a result of the horizontal movement of robotic mechanism 12 along track 21 and the vertical movement of gripper mechanism 50 the track mounted robotic mechanism may manipulate media cartridges 14 anywhere horizontally and vertically along the three rows 31, 32, and 33. In contrast, typical track mounted robotic mechanisms may only manipulate media cartridges horizontally in one row.

It is to be noted that typically media cartridge players are located at the end of a row of media cartridge storage cells. The vertical size of the media cartridge players are generally larger than the vertical size of the media cartridge storage cells. For example, the vertical size of two media cartridge players is roughly equal to the vertical size of three rows of media cartridge storage cells. Because of the differences in vertical size, typical storage libraries space two rows of media cartridge storage cells apart from one another to line up with two respective media cartridge players thereby resulting in a loss of space efficiency. The method and system of the present invention overcome this problem by enabling the robotic mechanism to access more than one row of media cartridge storage cells and media cartridge players. Thus, the rows of media cartridge storage cells of a storage library in accordance with the method and system of the present invention may be spaced adjacent to one another. For example, as shown in FIG. 2, three rows of media cartridge storage cells may be spaced adjacent to one another and are serviced by two rows of media cartridge players (not specifically shown in FIG. 2).

Referring now to FIG. 3 and FIGS. 4A, 4B, 4C, and 4D, with continual reference to FIG. 1, an alternative embodiment of a robotic mechanism 60 for use with the method and system of the present invention is shown. In general, like robotic mechanism 12, robotic mechanism 60 may also manipulate media cartridges 14 anywhere horizontally and vertically along the three rows 31, 32, and 33. To this end, robotic mechanism 60 includes a gripper mechanism 62 for gripping media cartridges 14 and a trolley or carriage 64.

Trolley 64 mounts in track 21. A servo motor 66 is operable to drive trolley 64 to move robotic mechanism 60 horizontally along track 21.

A pair of parallel linkage arms 68 and 70 are connected to gripper mechanism 62. Servo motor 66 is also operable to drive linkage arms 68 and 70 such that the linkage arms rotate along an arc about respective pivot axes 72 and 74. In response to rotational movement of linkage arms 68 and 70, gripper mechanism 62 rotationally moves in correspondence. Gripper mechanism 62 may rotationally move from row 32 up to row 31 to access a media cartridge 14 in row 31. Similarly, gripper mechanism 62 may rotationally move from row 31 down through row 32 and then down to row 33 to access a media cartridge 14 in row 33.

Figure 4A:
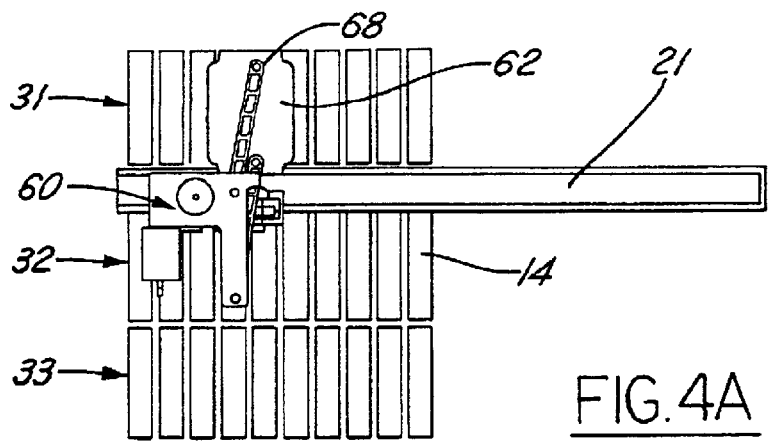
FIGS. 4A, 4B, 4C, and 4D illustrate a rotational movement of the robotic mechanism shown in FIG. 3.
Figure 4B:
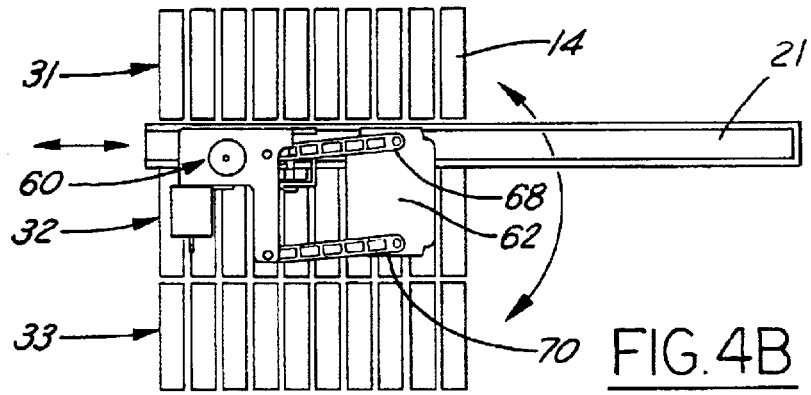
Figure 4C:
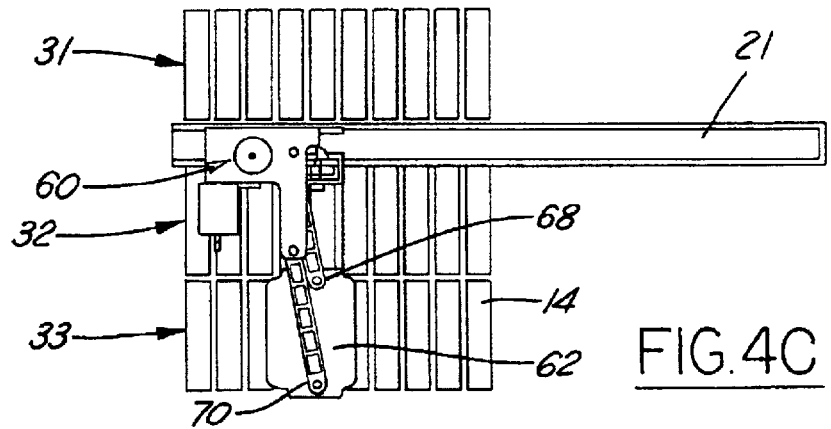
Figure 4D:
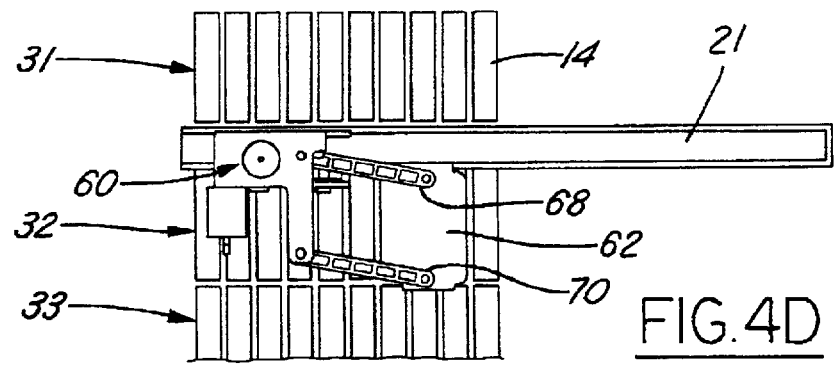

In FIG. 4A, gripper mechanism 62 has been rotationally moved upward with respect to the body of robotic mechanism 12 to access media cartridges in row 31. In FIG. 4B, gripper mechanism 62 has rotationally moved down from row 31 to a position generally parallel with respect to the body of robotic mechanism 12. In this position, robotic mechanism 12 may easily move horizontally along track 21 and overcome inertia problems as opposed to when gripper mechanism 62 is above or below the body of the robotic mechanism. In FIG. 4C, gripper mechanism 62 has rotationally moved downward with respect to the body of robotic mechanism 12 to access media cartridges in row 33. In FIG. 4D, gripper mechanism 62 has rotationally moved upward from row 33 to row 32 in order to access media cartridges in row 32.

It is to be appreciated that robotic mechanism 60 may be configured with the appropriately sized linkage arms to extend across more than three rows. Robotic mechanism 60 may include additional gripper mechanisms supported by an additional pair of linkage arms. Further, instead of linkage arms, robotic mechanism 60 may include telescoping arms that can extend from one row to another row. For instance, from a first row to a fourth row.

Figure 5:
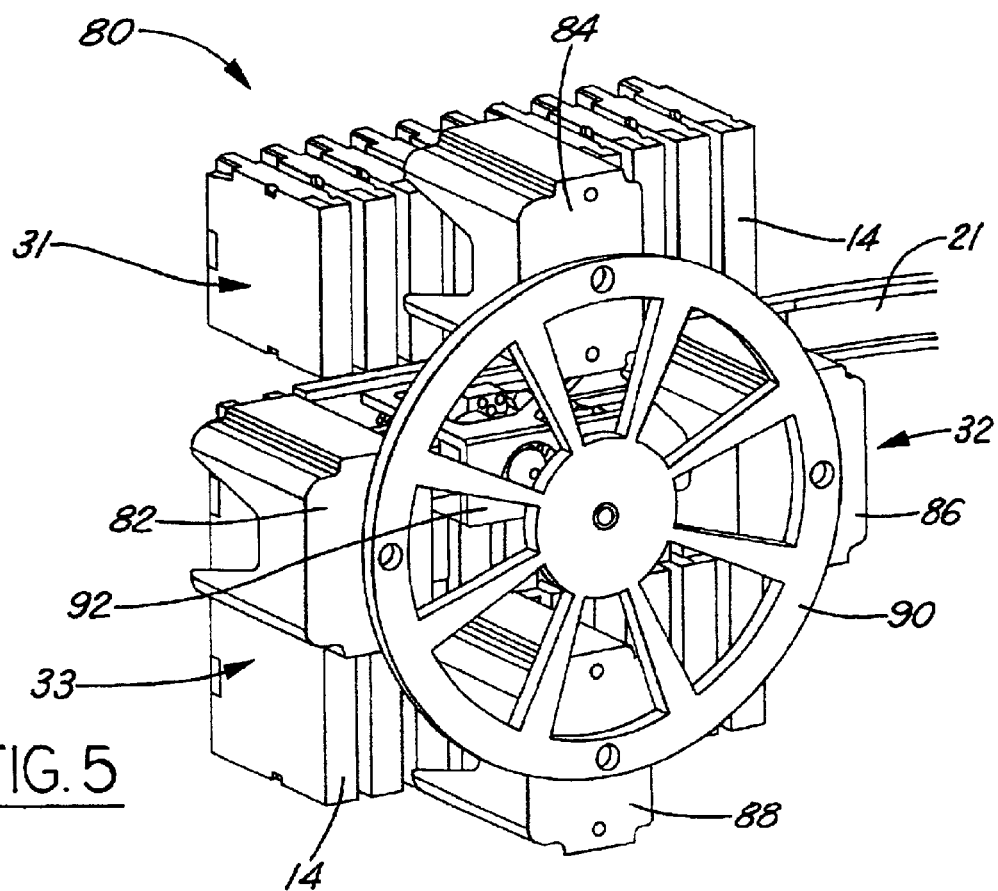
FIG. 5 illustrates a perspective view of another alternative embodiment of a robotic mechanism in accordance with the method and system of the present invention.

Referring now to FIG. 5, a perspective view of another alternative embodiment of a robotic mechanism 80 in accordance with the method and system of the present invention is shown. In general, like robotic mechanisms 12 and 60, robotic mechanism 80 may also manipulate media cartridges 14 anywhere horizontally and vertically along three or more rows including rows 31, 32, and 33. Robotic mechanism 80 includes a Ferris wheel type arrangement of four gripper mechanisms 82, 84, 86, and 88. Each gripper mechanism 82, 84, 86, and 88 is supported on a wheel 90. A carriage or trolley 92 is connected to wheel 90. Trolley 92 mounts in track 21 to move robotic mechanism 90 horizontally along the track.

A servo motor is operable to rotate wheel 90 such that gripper mechanisms 82, 84, 86, and 88 move along in a circle from one row to another row. For example, wheel 90 may rotate to move gripper mechanism 82 from row 32 up to row 31; gripper mechanism 84 from row 31 down to row 32; gripper mechanism 86 from row 32 down to row 33; and gripper mechanism 88 from row 33 up to row 32. Robotic mechanism 80 is suited with functioning with like Ferris wheel type robotic mechanisms to provide a measure of redundancy on a row. That is, the wheels of two robotic mechanisms 80 may move to position gripper mechanisms on the same row. In general, robotic mechanisms capable of providing orbital movement to gripper mechanisms such as robotic mechanism 80 and robotic mechanism 60 shown in FIG. 3 may function together to provide this measure of redundancy on a row.

Thus it is apparent that there has been provided, in accordance with the present invention, a method and system for accessing multiple rows of media objects in an automated storage library using a single track mounted robotic mechanism that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A storage library for the storage and retrieval of media objects, the storage library comprising:

a frame;

first and second horizontally arranged rows of media object storage cells arranged within the frame in a common plane, each of the media object storage cells for housing a media object;

a horizontally arranged track attached to the frame and arranged in the common plane, the track being disposed adjacent to the first row of media object storage cells;

a robotic mechanism coupled to the track for moving horizontally along the track; and a media object manipulation mechanism coupled to the robotic mechanism, wherein the media object manipulation mechanism is vertically movable for moving between the first and second rows of media object storage cells when the robotic mechanism is coupled to the track in order to manipulate the media objects housed within the first and second rows of media object storage cells.

2. The storage library of claim 1 wherein:

the media object manipulation mechanism is a gripper mechanism.

3. The storage library of claim 1 wherein:

the media object manipulation mechanism is vertically movable to move from the first row of media object storage cells to the second row of media object storage cells.

4. The storage library of claim 3 wherein:

the media object manipulation mechanism is vertically movable to move from the second row of media object storage cells back to the first row of media object storage cells.

5. The storage library of claim 1 further comprising:

a third horizontally arranged row of media object storage cells arranged within the frame in the common plane, wherein the media object manipulation mechanism is vertically movable for moving between the first, second, and third rows of media object storage cells in order to manipulate the media objects housed within the first, second, and third rows of media object storage cells.

6. The storage library of claim 1 wherein:

the track is disposed between the first and second rows of media object storage cells.

7. The storage library of claim 1 wherein:

the second row of media object storage cells is below the first row of media object storage cells and the track is disposed above the first row of media object storage cells.

8. The storage library of claim 1 wherein:
the media objects include media cartridges.

9. The storage library of claim 1 wherein:
the media objects include media players.

10. The storage library of claim 1 further comprising:
third and fourth horizontally arranged rows of media object storage cells arranged within the frame in the common plane, each of the media object storage cells for housing a media object;
a second horizontally arranged track attached to the frame and arranged in the common plane, the second track being disposed between the second and third rows of media object storage cells; and
a second robotic mechanism coupled to the second track for moving horizontally along the second track; and
a second media object manipulation mechanism coupled to the second robotic mechanism, wherein the second media object manipulation mechanism is vertically movable for moving between the third and fourth rows of media object storage cells when the second robotic mechanism is coupled to the second track in order to manipulate the media objects housed within the third and fourth rows of media object storage cells.

11. The storage library of claim 10 wherein:
the second media object manipulation mechanism is vertically movable for moving between the second and third rows of media object storage cells when the second robotic mechanism is coupled to the second track to manipulate the media objects housed within the second and third rows of media object storage cells.

12. The storage library of claim 1 wherein:
the media object manipulation mechanism directly moves vertically between the first and second rows of media object storage cells.

13. The storage library of claim 1 wherein:
the media object manipulation mechanism rotates to move vertically between the first and second rows of media object storage cells.

14. A storage library for the storage and retrieval of media objects, the storage library comprising:
a frame;
first, second, and third horizontally arranged parallel rows of media object storage cells arranged within the frame in a common plane, the second row of media object storage cells disposed between the first and third rows of media object storage cells, each of the media object storage cells for housing a media object;
a first track attached to the frame and arranged in the common plane, the first track being disposed adjacent to the first row of media object storage cells;
a second track attached to the frame and arranged in the common plane, the second track being disposed between the first and second rows of media object storage cells;
a first robotic mechanism coupled to the first track for moving horizontally along the first track, the first robotic mechanism having a first media object manipulation mechanism vertically movable for moving between the first and second rows of media object storage cells in order to manipulate the media objects housed within the first and second rows of media object storage cells; and
a second robotic mechanism coupled to the second track for moving horizontally along the second track, the second robotic mechanism having a second media object manipulation mechanism vertically movable for moving between the second and third rows of media object storage cells in order to manipulate the media objects housed within the second and third rows of media object storage cells.

15. A robotic mechanism for an automated storage library having first and second rows of media object storage cells arranged within a frame in a common plane, the robotic mechanism comprising:
a media object manipulation mechanism; and
a carriage for coupling to a track attached to the frame, arranged in the common plane and disposed between the first and second rows of media object storage cells to move the media object manipulation mechanism along the track, wherein the media object manipulation mechanism is vertically movable in order to manipulate media objects housed above and below the track in the first and second rows of media object storage cells of the automated storage library.

16. The storage library of claim 15 further comprising:
a carousel associated with the media object manipulation mechanism for rotating the gripper mechanism to be vertically movable.

17. A method of operating a storage library having first and second horizontally arranged rows of media object storage cells arranged within a frame in a common plane, each of the media object storage cells for housing a media object, and a horizontally arranged track attached to the frame, arranged in the common plane, and disposed adjacent to the first row of media object storage cells, the method comprising:
coupling a robotic mechanism to the track such that the robotic mechanism is attached to the frame by the track for horizontal movement along the track; and
vertically moving a media object manipulation mechanism coupled to the robotic mechanism between the first and second rows of media object storage cells when the robotic mechanism is coupled to the track; and
manipulating the media objects housed within the first and second rows of media object storage cells with the media object manipulation mechanism after the media object manipulation mechanism has been vertically moved.

18. The method of claim 17 wherein:
vertically moving the media object manipulation mechanism includes vertically moving the media object manipulation mechanism from the first row of media object storage cells to the second row of media object storage cells.

19. The method of claim 18 wherein:
vertically moving the media object manipulation mechanism includes vertically moving the media object manipulation mechanism from the second row of media object storage cells back to the first row of media object storage cells.

20. The method of claim 17 wherein the storage library includes a third horizontally arranged row of media object storage cells arranged within the frame in the common plane, wherein:
vertically moving the media object manipulation mechanism includes vertically moving the media object manipulation mechanism between the first, second, and third rows of media object storage cells in order to manipulate the media objects housed within the first, second, and third rows of media object storage cells.

21. The method of claim 17 wherein:

vertically moving the media object manipulation mechanism includes directly moving the media object manipulation mechanism vertically between the first and second rows of media object storage cells.

22. The method of claim 17 wherein:

vertically moving the media object manipulation mechanism includes rotating the media object manipulation mechanism to move vertically between the first and second rows of media object storage cells.

* * * * *